(12) United States Patent
Axley et al.

(10) Patent No.: US 12,105,191 B2
(45) Date of Patent: Oct. 1, 2024

(54) RADAR-BASED LOCALIZATION FROM INTERFERENCE

(71) Applicant: GOOGLE LLC, Mountain View, CA (US)

(72) Inventors: Andrew Larsen Axley, Mountain View, CA (US); Eric Michael Monsler, Mountain View, CA (US); Marci Meingast, Mountain View, CA (US)

(73) Assignee: Google LLC, Mountain View, CA (US)

( * ) Notice: Subject to any disclaimer, the term of this patent is extended or adjusted under 35 U.S.C. 154(b) by 441 days.

(21) Appl. No.: 17/500,605

(22) Filed: Oct. 13, 2021

(65) Prior Publication Data

US 2022/0113401 A1 Apr. 14, 2022

Related U.S. Application Data

(60) Provisional application No. 63/091,198, filed on Oct. 13, 2020.

(51) Int. Cl.
| | |
|---|---|
| G01S 13/88 | (2006.01) |
| G01S 1/04 | (2006.01) |
| G01S 7/00 | (2006.01) |
| G01S 7/02 | (2006.01) |
| G01S 7/40 | (2006.01) |
| G01S 13/56 | (2006.01) |

(52) U.S. Cl.
CPC .............. *G01S 13/88* (2013.01); *G01S 7/003* (2013.01); *G01S 7/023* (2013.01); *G01S 13/56* (2013.01); *G01S 1/04* (2013.01); *G08C 2200/00* (2013.01)

(58) Field of Classification Search
CPC ....................................................... G01S 7/023
See application file for complete search history.

(56) References Cited

U.S. PATENT DOCUMENTS

| | | | | |
|---|---|---|---|---|
| 2012/0313807 | A1* | 12/2012 | Yanagi .................. | G01S 13/726 342/107 |
| 2015/0294141 | A1 | 10/2015 | Molyneux et al. | |
| 2017/0328997 | A1 | 11/2017 | Silverstein et al. | |
| 2020/0025867 | A1* | 1/2020 | Chen ..................... | G01S 7/0232 |
| 2020/0296659 | A1* | 9/2020 | Kunjar .................... | G01S 7/023 |
| 2022/0026523 | A1* | 1/2022 | Heiss .................... | G01S 7/0234 |

\* cited by examiner

*Primary Examiner* — Bernarr E Gregory
*Assistant Examiner* — Juliana Cross
(74) *Attorney, Agent, or Firm* — Colby Nipper PLLC

(57) ABSTRACT

A radar-enabled device that manages radar interference. In particular, the radar-enabled device detects a radar signal transmitted by a second radar-enabled device, transmits a notification of the detected radar signal, receives localization information associated with the second radar-enabled device, and sets a device location based on the received localization information. Additionally, the radar-enabled device may adjust a timing of radar signal transmissions to avoid subsequent detections of radar signals transmitted by the second radar-enabled device.

26 Claims, 3 Drawing Sheets

RADAR-BASED LOCALIZATION FROM INTERFERENCE

CROSS-REFERENCE TO RELATED APPLICATIONS

This application claims priority to U.S. Patent Application Ser. No. 63/091,198, filed Oct. 13, 2020, the disclosure of which is hereby incorporated by reference in its entirety.

TECHNICAL FIELD

This disclosure relates to localization and interference management of radar-enabled devices.

BACKGROUND

A radar sensor measures the distance between the sensor and objects in the sensor's field of view by emitting a signal having a modulated frequency that changes over time. The signal, sometimes referred to as a chirp, repeats periodically. When the signal hits an object, a portion of the signal is reflected and detected by the sensor. The sensor determines the distance to the object based on the frequency difference of the emitted and reflected signals.

Network-connected devices may use radar sensing for presence detection. When a radar-enabled device detects a person in proximity to the device, a function of the device may be activated or otherwise respond accordingly. For example, a light may turn on when a person enters a room or a predetermined zone in proximity to the light and turn off when the person leaves the room or zone.

Accuracy of radar-based presence detection may be impacted by interfering radar signals emitted from devices in proximity to each other. As a result of such interference, a radar-enabled device may not detect a person who is present, or may falsely detect a person who is not present, thereby negatively impacting performance of proximity-based features of the device.

SUMMARY

This disclosure describes systems and methods for identifying co-located radar devices and adjusting their behavior based on their presence, thereby improving performance of various features of radar-enabled devices located in proximity to each other.

In an embodiment, a method of localizing a first radar-enabled device is provided, where the method may include: detecting, at the first radar-enabled device, a radar signal transmitted by a second radar-enabled device different from the first radar-enabled device; in response to the detecting, obtaining localization information of the second radar-enabled device; setting localization information of the first radar-enabled device based on the localization information of the second radar-enabled device; and configuring operation of the first radar-enabled device based on the localization information of the first radar-enabled device.

In another embodiment, a radar-enabled electronic device is provided and may include a radar transceiver, a memory storing a set of computer-executable instructions, and a processor interfacing with the radar transceiver and the memory. The processor may be configured to execute the set of computer-executable instructions to cause the processor to: detect, via the radar transceiver, a radar signal transmitted by an additional radar-enabled device different from the radar-enabled device, in response to detecting the radar signal, obtain localization information of the additional radar-enabled device, set localization information of the radar-enabled device based on the localization information of the additional radar-enabled device, and configure operation of the radar-enabled device based on the localization information of the radar-enabled device.

Additionally, in an embodiment, a method of localizing a first radar-enabled device is provided, where the method may include: determining, at the first radar-enabled device, that the first radar-enabled device is co-located with a second radar-enabled device; in response to the detecting, obtaining localization information of the second radar-enabled device; setting localization information of the first radar-enabled device based on the localization information of the second radar-enabled device; and configuring operation of the first radar-enabled device based on the localization information of the first radar-enabled device.

In a further embodiment, a non-transitory computer readable storage medium storing one or more programs is provided, where the one or more programs may comprise instructions, which, when executed by a first radar-enabled electronic device with one or more processors, cause the first radar-enabled electronic device to perform operations comprising: detecting a radar signal transmitted by a second radar-enabled device different from the first radar-enabled device; in response to the detecting, obtaining localization information of the second radar-enabled device; setting localization information of the first radar-enabled device based on the localization information of the second radar-enabled device; and configuring operation of the first radar-enabled device based on the localization information of the first radar-enabled device.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

DETAILED DESCRIPTION

Radar-enabled devices in proximity to each other can detect each other's presence by sensing each other's radar signals, or by sensing interference caused by each other's radar signals. Radar-enabled devices typically try to avoid interfering radar signals due to the negative impact interference may have on presence detection results. However, the detection of an interfering radar signal may be used as an indication of device co-location. Such an indication may be useful in identifying localization information among co-located devices (e.g., devices located in the same room or zone, or are otherwise located in proximity to each other such that radar interference between the two devices may occur). For example, if a first radar-enabled device can detect a second radar-enabled device's radar signals, then the first and second radar-enabled devices are likely co-located. A radar-enabled device may modify or control its transmissions to avoid interference with another radar-enabled device(s) once it has determined it is co-located with the other radar-enabled device(s).

Figure 1:
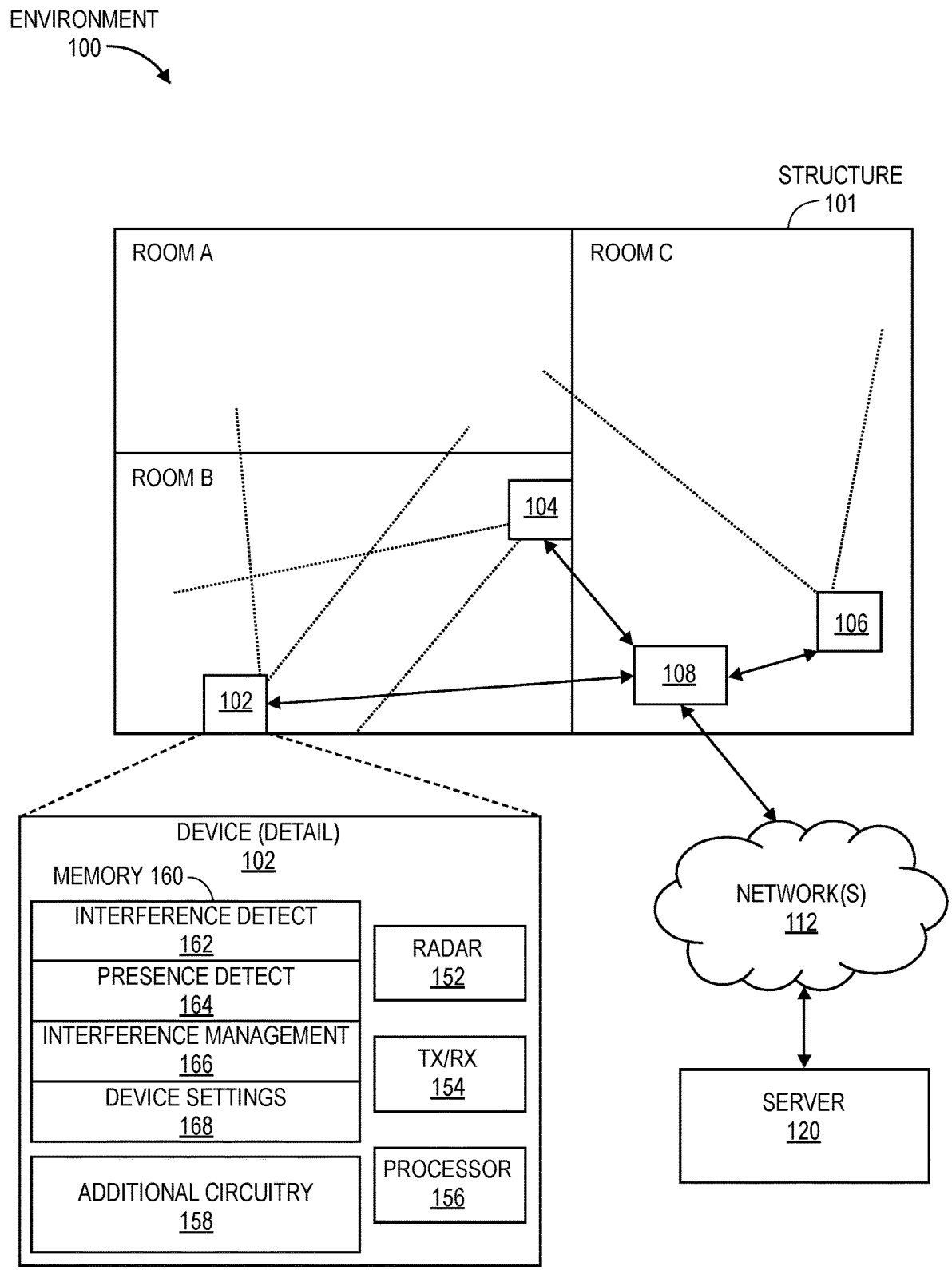
FIG. 1 is a diagram of an environment including network-connected radar-enabled devices in accordance with some implementations.

FIG. 1 is a diagram of an environment 100 including a plurality of network-connected radar-enabled devices 102, 104, and 106 located in a structure 101. The structure 101 may be any building or physical space comprising one or more rooms (e.g., a home, office, store, etc.) or distinct physical areas/spaces. More generally, the structure 101 may be any physical space, indoors or outdoors, comprising one or more areas in which a person(s) and/or object(s) may be located. The radar-enabled devices 102, 104, and 106 may be network-connected devices, each including a radar sensor configured to detect the presence of a person(s) and/or object(s) in its respective field of view. Example radar-enabled devices include lights, speakers, displays, cameras, thermostats, or any other electronic device configured to perform various actions or operations, including actions and operations based on the detected presence of a person or object.

As illustrated in FIG. 1, the structure 101 depicts two radar-enabled devices 102 and 104 that are co-located (e.g., located in the same room or zone, or otherwise located in proximity to each other such that radar interference between the devices may occur). The structure 101 includes three rooms (A, B, and C), where Room B includes the co-located radar-enabled devices 102 and 104, and Room C includes the third radar-enabled device 106. For example, Room B may be a bedroom, radar-enabled device 102 may be a video assistant device that is configured to turn on a display when a person enters the room, and radar-enabled device 104 may be a thermostat that is configured to set a predetermined temperature when a person enters the room. Because the radar-enabled devices 102 and 104 are both co-located in Room B, these radar-enabled devices 102, 104 may experience radar interference. Additionally, because the radar-enabled device 106 is not co-located with the other radar-enabled devices 102, 104 in Room B, the radar-enabled device 106 may not experience radar interference with the radar-enabled devices 102, 104.

The radar-enabled devices 102, 104, and 106 may be communicatively coupled to a local hub 108 via a local network, or to each other via a peer-to-peer network (not shown). The local hub 108 may be an electronic device that may implement or may otherwise be communicatively coupled with a local area network (e.g., a Wi-Fi network) of the structure 101. In some implementations, the local hub 108 may be communicatively coupled with a remote server 120 via one or more wide area networks 112 (e.g., the Internet).

Each of the radar-enabled devices 102, 104, 106 may be generally referred to herein as an electronic device. According to embodiments, a given device may be a portable or mobile radar-enabled device (e.g., a phone or tablet), or may be a static radar-enabled device (e.g., an assistant speaker device). In some scenarios, a given device may be a static device in some situations (e.g., a tablet that is docked on a stand) and may be a portable device in other situations (e.g., a tablet that is being carried throughout a home). In some implementations, one of the radar-enabled devices 102, 104, 106, the local hub 108, and the server 102 may have the role of a coordinator device that may facilitate various functionalities as described herein, where the role assignment may be predetermined or dynamically determined or elected.

FIG. 1 illustrates various components of the radar-enabled device 102, however, it should be appreciated that the other radar-enabled devices 104, 106 may include the same or similar components. In particular, the radar-enabled device 102 may include a radar sensor 152 configured to emit and detect radar signals. Such detected radar signals may include radar signals emitted by the same radar sensor 152 and reflected off of an object, such as a person; radar signals emitted by a radar sensor of another radar-enabled device (referred to herein as a listening detection scenario); and/or radar signals emitted by the same radar sensor 152, reflected off of an object, and subject to interference from interfering radar signals (referred to herein as a collision detection scenario). In this collision detection scenario, the interfering radar signals may not be directly detectable. For example, radar signals emitted by the radar-enabled device 102 may interfere with radar signals emitted by the radar-enabled device 104 even though the radar-enabled device 104 cannot directly detect the radar signals emitted by the radar-enabled device 102.

Each of the radar-enabled devices 102, 104, and 106 (as depicted in detail for device 102) further includes one or more transceivers (Tx/Rx) 154. Each transceiver 154 is configured to transmit and receive communications using one or more communication protocols to and from the local hub 108 and/or directly to and from other radar-enabled devices. For example, one of the transceivers 154 may be a radar transceiver or radar sensor configured to transmit a plurality of radar signals and detect a plurality of reflected radar signals corresponding to the plurality of transmitted radar signals. It should be appreciated that the radar-enabled devices 102, 104, 106 may support other communication protocols, including Wi-Fi, Bluetooth®, Bluetooth® Low Energy (BLE), and/or others. In particular, the one or more transceivers 154 may function in accordance with IEEE standards, 3GPP standards, or other standards, and may include one or more WWAN, WLAN, and/or WPAN transceivers configured to connect the radar-enabled devices 102, 104, 106 to wide area networks, local area networks, and/or personal area networks.

According to embodiments, the radar-enabled devices 102, 104, 106 may additionally or alternatively support ultra wideband (UWB) technology. For example, one of the transceivers 154 of the radar-enabled device 102 may be a UWB transceiver that may be configured to transmit a plurality of pulses (e.g., each every two nanoseconds or other time periods) across a wide spectrum frequency (e.g., 500 MHz or other frequencies), and a UWB transceiver 154 of the radar-enabled device 104 may detect the plurality of pulses, analyze or identify the incoming pulse pattern, and translate the plurality of pulses into data. After the radar-enabled device 104 detects the radar-enabled device 102, the devices 102, 104 may start ranging or measuring the distance between the devices 102, 104 by calculating the time of flight (ToF) of a pulse sent from the device 102 to the device 104 (or vice-versa). Based on the detection or ranging, the device 102 and/or the device 104 may determine or deem itself to be co-located with the other device 104, 102.

Each of the radar-enabled devices 102, 104, and 106 (as depicted in detail for device 102) may further include a processor 156 and a memory 160. The memory 160 may store programs and modules that, when executed by the processor 156, perform one or more of the functions as described and discussed herein, for example with reference to FIGS. 2 and 3. The processor 156 (and optionally additional processors, not shown) may execute the programs stored in the memory 160. It should be appreciated that the memory 160 may be one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The memory 160 may include the following components: an interference detection module 162 for analyzing radar signals detected by the radar sensor 152, such as to detect radar interference; a presence detection module 164 for detecting presence of an object (e.g., a person) by either (i) analyzing radar signals detected by the radar sensor 152 to detect a presence of an object, or (ii) receiving, via the transceiver 154, presence detection data from a co-located radar-enabled device(s) when the radar sensor 152 is powered down or otherwise not operating; an interference management module 166 for determining an adjustment(s) to the radar signal transmission timing of the radar sensor 152 to avoid interference with radar signals emitted by co-located radar-enabled devices; and device settings 168, including localization data (location, zone, room name, etc.), radar signal transmission timing data (e.g., chirp transmission frequency, transmission slot data, etc.), radar sensor state, device type, and/or any other settings or data necessary to operate the radar-enabled device.

Each of the radar-enabled devices 102, 104, and 106 (as depicted in detail for device 102) may optionally include additional circuitry 158 configured to implement device-specific features. For example, if the radar-enabled device 102 is a light, the additional circuitry 158 may include illumination control circuitry; if the radar-enabled device 102 is a speaker, the additional circuitry 158 may include audio processing circuitry; if the radar-enabled device 102 is a display, the additional circuitry 158 may include display panel control circuitry; if the radar-enabled device 102 is a camera, the additional circuitry 158 may include image and/or video processing circuitry; if the radar-enabled device 102 is a thermostat, the additional circuitry 158 may include temperature control circuitry; and so forth. According to embodiments, a common element among the different examples of the additional circuitry 158 is that a function implemented by the additional circuitry 158 may be configured to activate, deactivate, or otherwise operate in accordance with a result(s) of a presence detection (e.g., the presence of a person in the room as detected by the presence detection module 164).

In some implementations, one or more of the radar-enabled devices may not have additional circuitry 158. For example, a radar motion sensor may be configured to detect presence of a person or object, where this presence detection data may not be used locally by the radar-enabled device. Instead, the presence detection data may be sent over the local network (and/or over the network(s) 112). In some scenarios, the presence detection data may be used to inform a user (e.g., via a mobile device application) that presence was detected. In other cases, the presence detection data may be used to trigger device-specific features on another electronic device. For example, a presence detection at a first radar-enabled device 102 may cause an electronic light to turn on, regardless of whether the light is part of the radar-enabled device 102 or separate from the radar-enabled device 102.

Figure 2:
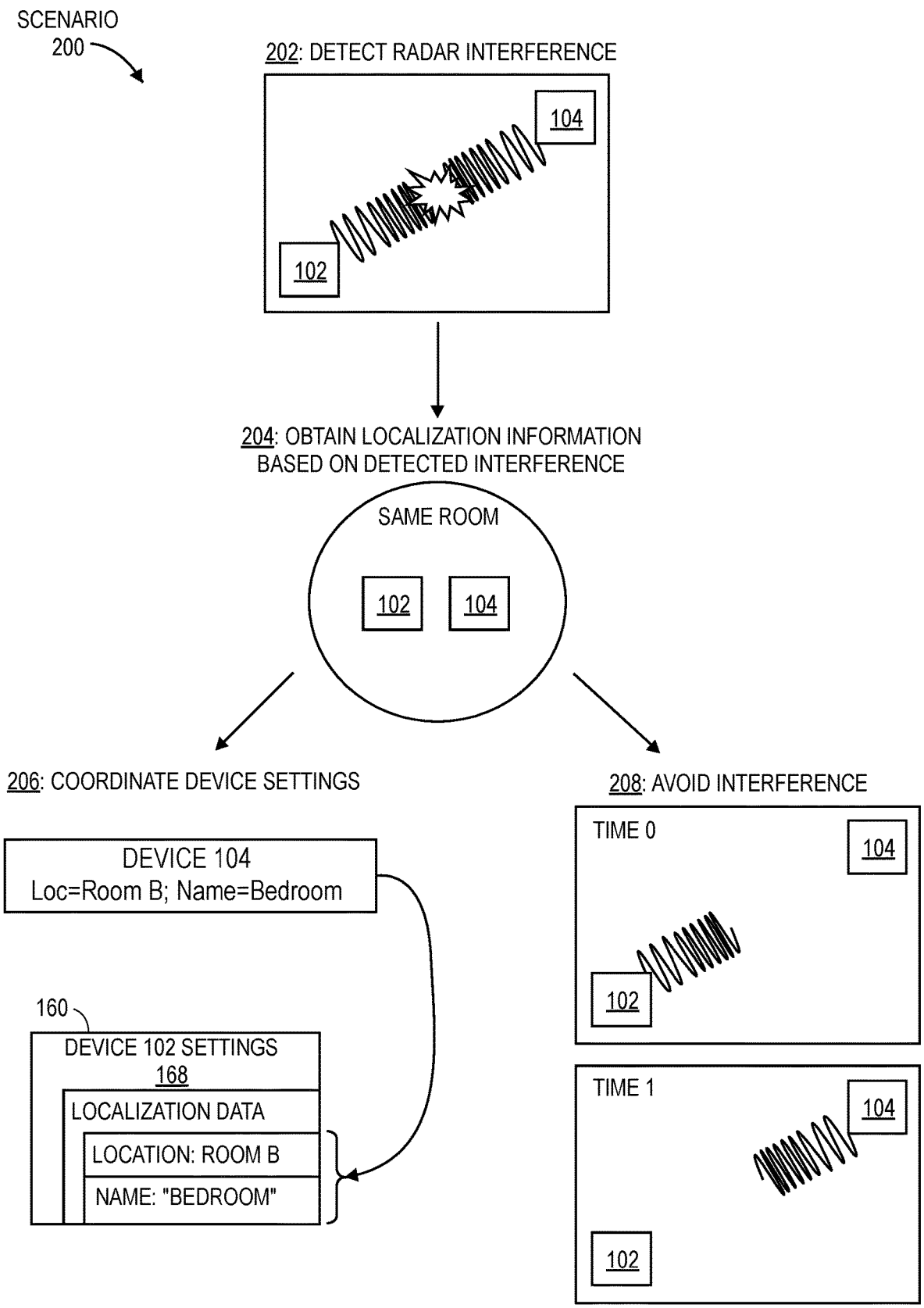
FIG. 2 is a diagram depicting various co-location detection and interference management functionalities in accordance with some implementations.

FIG. 2 is a diagram of various stages or steps of a co-location detection and interference management scenario 200. At a first phase 202 of the scenario 200, one or more radar-enabled devices may detect interference (e.g., using respective interference detection modules 162).

According to embodiments, various interference detection scenarios are envisioned. In a listening detection scenario, a radar-enabled device may detect interference by forgoing transmission of radar signals for a predetermined period of time (i.e., a listening period) and detecting a radar signal during the listening period. Radar signals detected during the listening period may be assumed to have been transmitted by a radar-enabled device that is co-located with the radar-enabled device that is forgoing transmission of radar signals. In this scenario, the interference detection module 162 may track radar signals detected during the listening period and group the detected signals based on apparent signal sources. For example, the interference detection module 162 may infer that radar signals detected once a minute at a particular offset are being transmitted by a first co-located radar-enabled device, while radar signals detected once a minute having a different offset are being transmitted by a second co-located radar-enabled device different from the first radar-enabled device. In some implementations, instead of or in addition to implementing a listening period, a radar-enabled device may detect interference by disambiguating received radar signals by their type (i.e., the type of the radar signal). For example, some devices may use unmodulated continuous wave radar, while other devices may use modulated continuous wave radar.

In a collision detection scenario, a radar-enabled device may detect interference by transmitting a plurality of radar signals, detecting a plurality of reflected radar signals corresponding to the plurality of transmitted radar signals, and determining (e.g., based on an analysis of the reflected radar signals by the interference detection module 162) that at least one of the plurality of reflected radar signals has a characteristic indicative of a collision with another radar signal (e.g., the other radar signal having been emitted by a different radar-enabled device).

In this scenario, the interference detection module 162 may determine that a particular radar signal has a characteristic indicative of a collision. As a result of such a determination, the particular radar signal can be assumed to have collided with a radar signal emitted by a co-located radar-enabled device. An example characteristic indicative of a collision may be an abnormal energy pattern within the reflected radar signal. In collision detection scenarios, if radar signals emitted by a first radar-enabled device (e.g., the radar-enabled device 102) are found to be interfering with radar signals emitted by a second radar-enabled device (e.g., the radar-enabled device 104), then the opposite is likely to be true as well—that is, radar signals emitted by the second radar-enabled device (e.g., the radar-enabled device 104) will be found to be interfering with radar signals emitted by the first radar-enabled device (e.g., the radar-enabled device 102). As such, in the collision detection scenario, two radar-enabled devices may simultaneously detect each other's radar interference.

According to some implementations, a first radar-enabled device may determine that it is co-located with a second radar-enabled device without the use of radar signaling. Instead, in an implementation, the first and second radar-enabled devices may detect each other by detecting UWB pulses and/or performing a UWB ranging measurement, as described herein. In another implementation, the first and second radar-enabled devices may detect each other via a personal area network (PAN), such as a Bluetooth® or BLE handshake. It should be appreciated that additional or alternative detection techniques, other than using radar signaling, are envisioned. Upon the first radar-enabled device detecting the second radar-enabled device, the first radar-enabled device may determine or deem that it is co-located with the second radar-enabled device.

In these implementations, the first radar-enabled device may optionally confirm that it is co-located with the second radar-enabled device using radar signaling. In particular, in response to determining or deeming co-location, the first and second radar-enabled devices may implement the listening detection scenario and/or the collision detection scenario as described herein. If the first radar-enabled device, when implementing the listening detection scenario and/or the collision detection scenario, detects interference, then then first radar-enabled device may confirm that it is co-located with the second radar-enabled device. Conversely, if the first radar-enabled device, when implementing the listening detection scenario and/or the collision detection scenario, does not detect interference, then then first radar-enabled device may not confirm that it is co-located with the second radar-enabled device.

At a second phase 204 of the scenario 200, one or more radar-enabled devices may obtain localization information based on or in response to the detected radar interference. In an implementation, the one or more radar-enabled devices may facilitate the second phase 204 after determining co-location using a technique other than radar signaling, and with or without confirming the co-location using radar signaling. As described herein, localization information may be information describing the location of a radar-enabled device, such as a room or a zone within a structure, building, physical space, or the like, where the localization information may refer to a co-location and/or an absolute location. Radar-enabled devices may be deemed as co-located when they are close enough such that radar signals transmitted by such devices have had, or could have, a collision. In some implementations, a determination that two radar-enabled devices are not co-located may be valuable as well. For example, such a determination could be an indication that the two devices provide non-overlapping fields of view and are thus better positioned for whole home (or whole structure) presence-detection coverage. When two radar-enabled devices determine that they are co-located, the radar-enabled devices may share information to determine their absolute location. An example location may include or indicate a room, zone, or position in a house/structure (e.g., upstairs, downstairs, etc.). An example location may additionally or alternatively be described with reference to a larger frame of reference (e.g., GPS latitude/longitude coordinates).

The detection of interfering radar signals may be used as a basis for making localization determinations. For instance, if a first radar-enabled device (e.g., 102) detects radar signals transmitted by a second radar-enabled device (e.g., 104) in accordance with the listening detection scenario described herein, or detects interfering radar signals in its own reflected radar signals in accordance with the collision detection scenario described herein, the second radar-enabled device may be assumed or deemed to be co-located with the first radar-enabled device. Because it may be assumed or deemed that the two radar-enabled devices are co-located, localization information of the second radar-enabled device (e.g., information that is already known to the second radar-enabled device) may be used as a basis for filling in missing localization information of the first radar-enabled device.

To obtain the localization information of the second radar-enabled device, the first radar-enabled device may transmit, using the transceiver 154, a notification or communication (e.g., a notification of a detected radar signal as a result of a listening detection, or a notification of a detected interference as a result of a collision detection). In an implementation, the first radar-enabled device may transmit the notification to the local hub 108, which may optionally forward the notification to the server 120 for subsequent processing. Alternatively, the local hub 108 may receive the notification and perform subsequent processing itself. According to embodiments, the server 120 (or the hub 108) may determine, based on the notification, which radar-enabled device was the source of the detected radar signal (in the event of a listening detection) or the detected interference (in the event of a collision detection).

In the event of a listening detection, the server 120 (or the hub 108) may determine the source of the detected radar signal by comparing one or more characteristics of the detected radar signal to one or more characteristics of radar signals corresponding with other radar-enabled devices associated with the first radar-enabled device (e.g., associated with the same user account, structure account, or the like). For example, the first radar-enabled device (e.g., the radar-enabled device 102) may transmit, to the server 120 via the local hub 108, a notification that includes or indicates a particular frequency and offset of a detected radar signal. The server 120 may compare the particular frequency and offset to those associated with radar-enabled devices 104 and 106, and determine that the radar-enabled device 104 most closely matches the particular frequency and offset included or indicated in the notification. As a result of this determination, the server 120 may determine or deem that the first and second radar-enabled devices 102 and 104 are co-located. As a result of the co-location determination, and together with an optional determination that the first radar-enabled device 102 is missing localization information but the second radar-enabled device 104 already has or is otherwise associated with localization information, the server 120 may respond to the notification from the first radar-enabled device 102 by transmitting, to the first radar-enabled device 102, the localization information of the second radar-enabled device 104.

In the event of a collision detection, the server 120 (or the hub 108) may determine the source of the collision by simultaneously receiving collision notifications from two or more radar-enabled devices that may be associated with each other (e.g., associated with the same user account, structure account, or the like). Alternatively, the server 120 may receive collision notifications at different times, where each notification may designate that a collision happened at or close to the same time (e.g., the notifications designate an equivalent or near-equivalent timestamp). For example, the first radar-enabled device (e.g., the radar-enabled device 102) may transmit a first collision notification to the server 120 via the local hub 108. The server receives the first collision notification from the first radar-enabled device and a second collision notification from a second radar-enabled device (e.g., 104) at the same time, or at a different time but designating collisions at substantially the same time. Based on the first and second notifications indicating simultaneous collisions detected by the first and second radar-enabled devices 102 and 104, the server 120 may determine or deem that the first and second radar-enabled devices 102 and 104 are co-located. As a result of the co-location determination, together with an optional determination that the first radar-enabled device 102 is missing localization information but the second radar-enabled device 104 already has or is otherwise associated with localization information, the server 120 may respond to the notification from the first radar-enabled device 102 by transmitting, to the first radar-enabled device 102, the localization information of the second radar-enabled device 104.

In an alternative collision detection implementation, two or more radar-enabled devices may exchange collision notifications directly with each other (e.g., via a peer-to-peer network or other direct connection) or indirectly with each other (e.g., via the local hub 108). Upon a first radar-enabled device (e.g., the radar-enabled device 102) receiving a collision detection notification from a second radar-enabled device (e.g., the radar-enabled device 104), the first radar-enabled device 102 may compare collision data received in the collision detection notification to collision data detected locally, and if the collision data (i.e., the collision data in the notification and detected locally) are associated with the same or substantially the same timing, then the first radar-enabled device 102 may determine or deem that it is co-located with the second radar-enabled device 104. The exchange of collision detection notifications between the two or more radar-enabled devices may serve as a confirmation that an abnormal radar signal is the result of a collision, rather than accidental interference from other devices in the same frequency range.

At a third phase 206 of the scenario 200, one or more radar-enabled devices may coordinate their device settings based on the obtained localization information. For example, if the radar-enabled device 102 is missing localization information but obtains localization information from the radar-enabled device 104, the radar-enabled device 102 may set its localization information based on the obtained localization information of the radar-enabled device 104. In some implementations, the radar-enabled device 102 may set its localization information to be equivalent to the localization information of the radar-enabled device 104. For example, if the localization information of the radar-enabled device 104 indicates the location of the device 104 as Room B, and includes a customized name of Room B (e.g., "Bedroom"), the radar-enabled device 102 may set its corresponding localization data in its device settings 168 to Room B and "Bedroom."

According to embodiments, a first radar-enabled device may configure one or more operations or features based on its localization information (which may be based, in turn, on the localization information obtained from a second radar-enabled device). For example, the radar-enabled device 102 may be configured to behave or operate differently (e.g., by configuring one or more settings) depending on its location. In a particular example, an interactive/assistant (or smart) display device in a bedroom may configure its settings to enable sleep monitoring, while an interactive display device in a kitchen may configure its settings to facilitate virtual cookbook instructions. In another example, a camera located indoors may primarily detect people and pets, while a camera located outdoors may additionally enable package delivery and car detection.

As another example use of interference-derived co-location determinations, the first radar-enabled device 102 may reduce power to or completely power off its radar-based presence detection circuitry, which may include the radar sensor 152 and/or any radar transceiver, to save power. This may be particularly useful if the first radar-enabled device 102 is a power constrained device (e.g., battery powered). While the radar sensor 152 or any radar transceiver is powered down, the presence detection module 164 of the first radar-enabled device 102 can rely on presence detection results obtained by a co-located radar-enabled device (e.g., the radar-enabled device 104) and reported over the local network (e.g., using notifications communicated to the first radar-enabled device 102 via transceivers 154).

As another example use of interference-derived co-location determinations, a portable or mobile radar-enabled device (e.g., a phone or tablet) may be determined to be co-located with a static radar-enabled device (e.g., an assistant speaker device). In such a scenario, the co-location determination may indicate that a user of the portable radar-enabled device is present in a specified location (e.g., the room in which the static radar-enabled device is located). In this scenario, the portable radar-enabled device may be localized even if it does not have access to its primary means of localization (e.g., GPS, Wi-Fi, beacons, etc.).

Additionally or alternatively, such a co-location determination may be used to locate a portable radar-enabled device. In such a location scenario, a device in communication with the local hub 108 or server 120 may notify a user that the portable radar-enabled device is located in a particular location (e.g., the room in which the static radar-enabled device is located). Accordingly, the user may locate the portable radar-enabled device (e.g., a phone) as a result of the determined co-location, which may be particularly useful if the portable radar-enabled device is missing. More specifically, a static radar-enabled device may detect a radar signal emitted by a portable radar-enabled device, and transmit, to a server via a local and/or wide area network, (i) a notification of the detected radar signal, and (ii) its own localization information. The server may then determine which device was the portable radar-enabled device that emitted the radar signal detected by the static radar-enabled device, set the localization information of the portable radar-enabled device to be that of the static radar-enabled device, and transmit the localization information to a device being accessed by a user of the portable radar-enabled device (e.g., for the purpose of helping the user find the portable radar-enabled device). For example, if the device being accessed by a user is an assistant device and the user queries about the location of the portable radar-enabled device, the assistant device may annunciate or display the localization information corresponding to the portable radar-enabled device.

As another example use of interference-derived co-location determinations, a first radar-enabled device may be determined to be too close or proximate to a second radar-enabled device (e.g., in a security setting in which multiple motion sensors do not need to overlap the same field of view). In such a scenario, a co-location determination may be used to indicate that one of the radar-enabled devices may be placed farther away from the other. More specifically, a first radar-enabled device may detect a radar signal emitted by a second radar-enabled device, and transmit, to a server via a local and/or wide area network (or to the second radar-enabled device), an interference notification that the server (or the second radar-enabled device) may interpret as an indication that the first and second radar-enabled devices are co-located. In response to the co-location indication, the server (or the second radar-enabled device) may send an instruction or notification to a user (e.g., via an electronic device being used in a setup process) that indicates or instructs the user to move the first radar-enabled device farther away from the second radar-enabled device (or vice-versa). Alternatively or alternatively, upon detecting the radar signal emitted by the second radar-enabled device, the first radar-enabled device may transmit, to the server (or to the second radar-enabled device), an instruction or notification that indicates or instructs the user to move the second radar-enabled device farther away from the first radar-enabled device (rather than sending an interference notification).

As another example use of interference-derived co-location determinations, a determination of co-location between radar-enabled devices may be used as a basis for creation of a device layout map. In particular, the server may receive radar interference notifications from one or more radar-enabled devices associated with the same structure or building. As a result of a co-location determination between two of such devices, the server may populate a room in a layout map of the structure with the two co-located devices (i.e., may indicate that the two devices are co-located in the same room). As more radar-enabled devices interfere with each other and transmit corresponding interference notifications to the server, the more detailed the layout map of the structure may be.

As another example use of interference-derived co-location determinations, successive determinations of co-location may be used to infer user habits. For example, if a user is walking through a house and the user's radar-enabled device is successively determined to be co-located with one or more radar-enabled devices throughout the house with known localization information, a server may infer a path that the user took throughout the house. Indications of the user's path may be used (e.g., at the server 120) to enhance a device layout map, infer the user's habits (e.g., which paths the user takes and when), and also to detect location anomalies (e.g., when a detected path does not conform to a previously determined device layout map, this can be an indication that a radar-enabled device was moved to a new location in the structure).

As another example use of interference-derived co-location determinations, such determinations made by a plurality of radar-enabled devices in the same location may be used to enhance presence detections. For example, presence detection results from a plurality of radar-enabled devices in the same room may be assigned (e.g., at the server 120) a higher confidence value than presence detection results from a single radar-enabled device. Stated another way, independent radar signals detected by multiple radar-enabled devices may be processed to make a common motion detection, where such detections provide additional confidence that there is actually a person in the room, and minimize the chances and/or the effects of a false positive from a single radar-enabled device.

As another example use of interference-derived co-location determinations, such determinations made by a plurality of radar-enabled devices in the same location may be used to enhance the spatial resolution of the location. In particular, if two radar-enabled devices are in the same location (e.g., in the same room), it may be assumed that they are in different parts of the location (e.g., in different areas of the room). As such, each radar-enabled device in the location can be assigned (e.g., at the server 120) a different zone of that location. That way, functions of the radar-enabled devices may be triggered based on zone-based presence detections. For example, a light may be programmed to turn on when a person is detected in a first zone of a room (e.g., in the field of view of a first radar-enabled device located in the room) but not turn on when a person is detected in a second zone of the room (e.g., in the field of view of a second radar-enabled device located in the room).

A fourth phase 208 of the scenario 200 involves interference avoidance. The fourth phase 208 may be performed or facilitated prior to, concurrent with, or subsequent to the third phase 206, and may be performed or facilitated after the localization information has been obtained in the second phase 204. In other words, when a detected interference has been used to obtain localization information for a particular radar-enabled device, it may be beneficial for that radar-enabled device to avoid subsequent interference in order to maximize presence detection accuracy. A radar-enabled device (e.g., the radar-enabled device 102) that is determined to be co-located with another radar-enabled device (e.g., the radar-enabled device 104) may avoid interference by adjusting (e.g., using the interference management module 166) a radar transmission timing scheme to avoid subsequent detections of radar signals transmitted by the other radar-enabled device. In embodiments, the co-located radar-enabled devices may coordinate their radar signal transmissions in order to avoid subsequent interference. For example, the co-located radar-enabled devices may schedule their radar signal transmissions to not overlap (i.e., to be misaligned) with each other.

In some implementations, a co-located radar-enabled device may forego adjusting its radar transmission timing scheme as long as the rate at which interference is detected remains below a threshold. In such implementations, if there are no radar collisions for at least a predetermined time period, then co-located radar-enabled devices may maintain their current radar signal transmission timing schemes.

In some implementations, a co-located radar-enabled device may adjust its radar transmission timing scheme according to a central decision made at a coordinator device (e.g., the server 120, the local hub 108, a predetermined radar-enabled device 102, 104, 106, or a dynamically-elected radar-enabled device 102, 104, 106). In some implementations, the coordinator device and the plurality of radar-enabled devices may have absolute clock knowledge with a predetermined accuracy (e.g., 5 ms) or peer-to-peer relative pseudo-clock knowledge with a similar accuracy.

The coordinator device may have a record of each radar-enabled device coupled to a particular local network in a structure, as well as localization information of at least one of the radar-enabled devices. During an initial co-location detection phase (e.g., phase 202), the coordinator device (e.g., the server 120, the hub 108, or one of the radar-enabled devices 102, 104, 106) may schedule each radar-enabled device to transmit while the other devices are listening, in order to determine which radar-enabled devices are co-located and thus need their radar signal transmissions coordinated (as described herein with reference to the listening detection scenario). For sufficiently non-co-located devices, such coordination may be unnecessary. However, for devices that are determined or deemed to be co-located, the coordinator device may determine an adjusted radar signal transmission scheme for one or more of the devices in order to sufficiently space out the radar signal transmissions such that subsequent interference may be avoided.

According to embodiments, a first radar-enabled device (e.g., the radar-enabled device 102) may transmit an initial radar transmission timing scheme to a coordinator device (e.g., server 120 or the hub 108), and receive, from the coordinator device, an adjusted radar transmission timing scheme that may be based on (i) the initial radar transmission timing scheme of the radar-enabled device 102, and (ii) a radar transmission timing scheme of a second radar-enabled device (e.g., the radar-enabled device 104). In other words, the coordinator device may adjust the radar transmission timing scheme of the first radar-enabled device based on the initial radar transmission timing scheme of the first radar-enabled device and a radar transmission timing scheme of the second radar-enabled device. The adjustment may include adding or adjusting an offset of the radar transmission timing scheme of the first radar-enabled device so that the difference between (i) the added or adjusted offset of the radar transmission timing scheme of the first radar-enabled device and (ii) an offset of the radar transmission timing scheme of the second radar-enabled device 104 meets a threshold of time.

In some implementations, a co-located radar-enabled device may adjust its radar transmission timing scheme by adjusting a radar transmission time slot in accordance with a slotted communications protocol. Specifically, a plurality of radar-enabled devices (e.g., the radar-enabled devices 102, 104, and 106) may implement a common slotting strategy where each device may initially be assigned to or select a slot, and on a detected collision, transition to a different slot with a set probability.

According to embodiments, one or more radar-enabled devices may perform or facilitate interference avoidance when one of the radar-enabled devices is portable or mobile (e.g., a phone) and another of the radar-enabled devices is static (e.g., an assistant device). In particular, the portable (or static) radar-enable device may temporarily reduce interference, such as by adjusting its radar transmission timing scheme or performing another operation as described herein, such as for a set duration or during which the radar-enabled devices are detected to be co-located.

Concurrently with or subsequent to temporarily reducing interference, the radar-enabled devices may periodically or consistently determine whether they are still co-located, such as using radar signaling or using a non-radar signaling technique (e.g., UWB pulses or Bluetooth® handshaking). In an implementation, the radar-enabled devices may determine whether they are co-located by attempting to force a radar signaling collision. If either of the radar-enabled devices determines that it is no longer co-located, the portable (or static) radar-enabled device may revert back to its normal or previous operation, such as by reverting to a previous radar transmission timing scheme or performing another operation as described herein (e.g., adjusting various circuitry components).

Figure 3:
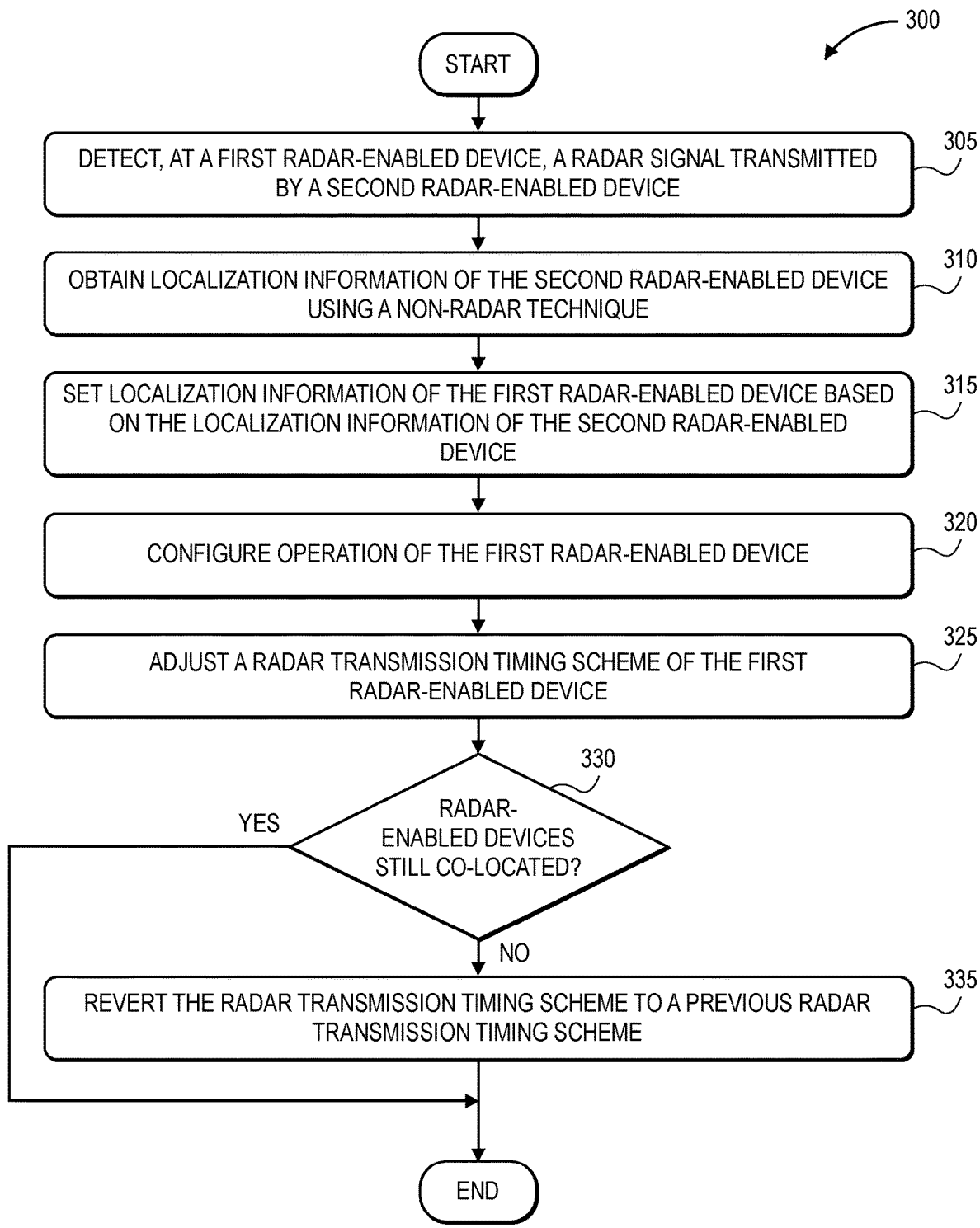
FIG. 3 is a flowchart depicting a co-location detection and interference management method in accordance with some implementations.

FIG. 3 is a flow diagram illustrating an example method 300 for localizing a radar-enabled device from radar interference. The method is, optionally, governed by instructions that are stored in a computer memory or non-transitory computer readable storage medium (e.g., the memory 160 as described with respect to FIG. 1) and that are executed by one or more processors of the radar-enabled device (e.g., the processor 156). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the method may be combined and/or the order of some operations may be changed. As described, the method 300 may be performed or facilitated by a first radar-enabled device, however it should be appreciated that additional or alternative devices or components may perform or facilitate one or more of the described functionalities.

The method 300 may begin when the first radar-enabled device detects (block 305) a radar signal transmitted by a second radar-enabled device. In a first implementation, the first radar-enabled device may forego transmission of radar signals for a first period of time, and detect the radar signal transmitted by the second radar-enabled device during the first period of time. In another implementation, the first radar-enabled device may transmit a plurality of radar signals, detect a plurality of reflected radar signals corresponding to the plurality of radar signals that were transmitted, and determine that at least one of the plurality of reflected radar signals has a characteristic indicative of a collision with another radar signal.

In a further implementation, the first radar-enabled device may initially detect the second radar-enabled device via a short range or PAN communication. After detecting the second radar-enabled device, the first radar-enabled device may detect a radar signal transmitted by the second radar-enabled device and, in response to detecting the radar signal, deem that the first radar-enabled device is co-located with the second radar-enabled device.

The first radar-enabled device may obtain (block 310) localization information of the second radar-enabled device, such as by using a non-radar technique. In an implementation, the first radar-enabled device may transmit, to a server, a notification of the radar signal that was detected, and receive, from the server, the localization information of the second radar-enabled device. In another implementation, the first radar-enabled device may receive the localization information directly from the second radar-enabled device, such as via a short range or PAN communication.

The first radar-enabled device may set (block 315) localization information of the first radar-enabled device based on the localization information of the second radar-enabled device. In embodiments, the first radar-enabled device may set the localization information of the first radar-enabled device to be equivalent to the localization information of the second radar-enabled device.

The first radar-enabled device may configure (block 320) operation of the first radar-enabled device based on the localization information of the first radar-enabled device. According to embodiments, the first radar-enabled device may adjust its power usage (e.g., by powering down its radar-based presence detection circuitry), may adjust various circuitry components, or may perform other actions. If the first radar-enabled device adjusts its power usage, the first radar-enabled device may receive, from the second radar-enabled device, a notification that the second radar-enabled device detected a presence of an object/person using radar.

The first radar-enabled device may also adjust (block 325) its radar transmission timing scheme, such as to avoid subsequent detections of radar signals transmitted by the second radar-enabled device. In an embodiment, the first radar-enabled device may transmit, to a server, an initial radar transmission timing scheme of the first radar-enabled device, and receive, from the server, an adjusted radar transmission timing scheme based on (i) the initial radar transmission timing scheme of the first radar-enabled device, and (ii) a radar transmission timing scheme of the second radar-enabled device. In another embodiment, the first radar-enabled device may adjust a radar transmission time slot of the first radar-enabled device in accordance with a slotted communications protocol.

The first radar-enabled device may determine (block 330) whether it is still co-located with the second radar-enabled device, such as if the first radar-enabled device is a portable or mobile device and the second radar-enabled device is static (or vice-versa). In embodiments, the first radar-enabled device may perform the determination by using radar signaling or using a non-radar signaling technique (e.g., UWB pulses or Bluetooth® handshaking). If the first radar-enabled device determines that it is still co-located with the second radar-enabled device ("YES"), processing may end or proceed to other functionality. If the first radar-enabled device determines that it is not still co-located with the second radar-enabled device ("NO"), processing may proceed to block 335, where the first radar-enabled device may revert the radar transmission timing scheme to a previous radar transmission timing scheme, and/or revert to another previous operation setting.

In embodiments, the first radar-enabled device may additionally or alternatively detect a second radar signal transmitted by a third radar-enabled device, and transmit, to a server, (i) a notification of the second radar signal that was detected, and (ii) the localization information of the first radar-enabled device. Alternatively or additionally, the first radar-enabled device may transmit, to the server or to the third radar-enabled device, an indication to move the third radar-enabled device farther away from the first radar-enabled device.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 156 (e.g., working in connection with an operating system) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The method 300 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The method 300 may be included as part of any backend server, client computing device modules of the example environment, for example, or as part of a module that is external to such an environment. Though the figures may be described with reference to the other figures for ease of explanation, the method 300 can be utilized with other objects and user interfaces. Furthermore, although the explanation above describes steps of the method 300 being performed by specific devices, this is done for illustration purposes only. The blocks of the method 300 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for managing sensor operation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of localizing a first radar-enabled device, the method comprising:
   detecting, at an interference detection module of the first radar-enabled device, a radar signal transmitted by a second radar-enabled device different from the first radar-enabled device;
   in response to the detecting, obtaining localization information by receiving localization information separate from the detected radar signal that indicates a location of the second radar-enabled device;
   setting localization information including a location of the first radar-enabled device within device settings of the first radar-enabled device based on the received localization information of the second radar-enabled device; and
   configuring operation, within an interference management module, of the first radar-enabled device based on the localization information of the first radar-enabled device.

2. The method of claim 1, wherein obtaining the localization information of the second radar-enabled device comprises:
   transmitting, to a server, a notification of the radar signal that was detected; and
   receiving, from the server, the localization information of the second radar-enabled device.

3. The method of claim 1, wherein setting the localization information of the first radar-enabled device comprises:
   setting the localization information of the first radar-enabled device to be equivalent to the localization information of the second radar-enabled device.

4. The method of claim 1, wherein detecting the radar signal transmitted by the second radar-enabled device comprises:
   forgoing transmission of radar signals at the first radar-enabled device for a first period of time; and
   detecting, at the first radar-enabled device, the radar signal transmitted by the second radar-enabled device during the first period of time.

5. The method of claim 1, wherein detecting the radar signal transmitted by the second radar-enabled device comprises:
   transmitting, at the first radar-enabled device, a plurality of radar signals;
   detecting, at the first radar-enabled device, a plurality of reflected radar signals corresponding to the plurality of radar signals that were transmitted; and
   determining that at least one of the plurality of reflected radar signals has a characteristic indicative of a collision with another radar signal.

6. The method of claim 1, further comprising:
   in accordance with obtaining the localization information of the second radar-enabled device:
      powering down radar-based presence detection circuitry of the first radar-enabled device, and
      receiving at least one radar-based presence detection notification from the second radar-enabled device.

7. The method of claim 1, further comprising:
   detecting, at the first radar-enabled device, a second radar signal transmitted by a third radar-enabled device; and
   transmitting, to a server, (i) a notification of the second radar signal that was detected, and (ii) the localization information of the first radar-enabled device.

8. The method of claim 1, further comprising:
   detecting, at the first radar-enabled device, a second radar signal transmitted by a third radar-enabled device; and
   transmitting, to a server or to the third radar-enabled device, an indication to move the third radar-enabled device farther away from the first radar-enabled device.

9. The method of claim 1, further comprising:
   subsequent to setting the localization information of the first radar-enabled device, adjusting a radar transmission timing scheme of the first radar-enabled device to avoid subsequent detections of radar signals transmitted by the second radar-enabled device.

10. The method of claim 9, wherein adjusting the radar transmission timing scheme of the first radar-enabled device comprises:
    at the first radar-enabled device:
       transmitting, to a server, an initial radar transmission timing scheme of the first radar-enabled device, and
       receiving, from the server, an adjusted radar transmission timing scheme based on (i) the initial radar transmission timing scheme of the first radar-enabled device, and (ii) a radar transmission timing scheme of the second radar-enabled device.

11. The method of claim 9, wherein adjusting the radar transmission timing scheme of the first radar-enabled device comprises:
adjusting a radar transmission time slot of the first radar-enabled device in accordance with a slotted communications protocol.

12. A non-transitory computer readable storage medium storing one or more programs, the one or more programs comprising instructions, which, when executed by a first radar-enabled electronic device with one or more processors, cause the first radar-enabled electronic device to perform operations comprising:
detecting a radar signal transmitted by a second radar-enabled device different from the first radar-enabled device;
in response to the detecting, obtaining localization information of the second radar-enabled device;
setting localization information of the first radar-enabled device based on the localization information of the second radar-enabled device;
configuring operation of the first radar-enabled device based on the localization information of the first radar-enabled device;
detecting, at the first radar-enabled device, a second radar signal transmitted by a third radar-enabled device; and
transmitting, to a server or to the third radar-enabled device, an indication to move the third radar-enabled device farther away from the first radar-enabled device.

13. The method of claim 1, wherein the localization information indicates the location is a specific room, a specific zone, or a specific level within a structure.

14. The method of claim 1, wherein the localization information is missing within the device settings of the first radar-enabled device prior to obtaining the communication that includes the localization information that describes the location of the second radar-enable device.

15. The method of claim 1, wherein configuring operating within the interference management module of the first radar-enable device based on the localization information of the first radar-enabled device comprises:
enabling sleep monitoring;
configuring an interactive display device; or
enabling package delivery or car detection.

16. The method of claim 1, wherein the first radar-enabled device is a mobile radar-enabled device and the method further comprises:
locating the first radar-enabled device using the localization information of the second radar-enabled device.

17. The method of claim 1, further comprising:
creating a device layout map based on the localization information of the second radar-enabled device.

18. A radar-enabled electronic device, comprising:
a radar transceiver;
a memory storing a set of computer-executable instructions; and
a processor interfacing with the radar transceiver and the memory, and configured to execute the set of computer-executable instructions to cause the processor to:
detect, via the radar transceiver, a radar signal transmitted by an additional radar-enabled device different from the radar-enabled device,
in response to detecting the radar signal, obtain localization information via a transmission, separate from the radar signal transmitted by the additional radar-enabled device, the localization information characterizes a location of the additional radar-enabled device,
set localization information including a location of the radar-enabled device within device settings of the radar-enabled device based on the localization information of the additional radar-enabled device, and
configure operation of the radar-enabled device based on the localization information of the radar-enabled device.

19. The radar-enabled electronic device of claim 18, wherein to detect the radar signal transmitted by the additional radar-enabled device, the processor is configured to:
forego transmission of radar signals via the radar transceiver for a first period of time, and
detect, via the radar transceiver, the radar signal transmitted by the additional radar-enabled device during the first period of time.

20. The radar-enabled electronic device of claim 18, wherein to detect the radar signal transmitted by the additional radar-enabled device, the processor is configured to:
transmit, via the radar transceiver, a plurality of radar signals,
detect, via the radar transceiver, a plurality of reflected radar signals corresponding to the plurality of radar signals that were transmitted, and
determine that at least one of the plurality of reflected radar signals has a characteristic indicative of a collision with another radar signal.

21. The radar-enabled electronic device of claim 18, further comprising:
an additional transceiver;
wherein the processor is configured to execute the set of computer-executable instructions to further cause the processor to:
in accordance with obtaining the localization information of the additional radar-enabled device:
power down the radar transceiver, and
receive, from the additional radar-enabled device via the additional transceiver, at least one radar-based presence detection notification.

22. The radar-enabled electronic device of claim 18, wherein the processor is configured to execute the set of computer-executable instructions to further cause the processor to:
subsequent to setting the localization information of the radar-enabled device, adjust a radar transmission timing scheme of the radar-enabled device to avoid subsequent detections of radar signals transmitted by the additional radar-enabled device.

23. A method of localizing a first radar-enabled device, the method comprising:
determining, at the first radar-enabled device, that the first radar-enabled device is co-located with a second radar-enabled device;
in response to the determining, obtaining localization information via a transmission separate from determining that the first radar-enable device is co-located with the second radar-enabled device, the localization information describes a location of the second radar-enabled device;
setting localization information including a location of the first radar-enabled device within device settings of the first radar-enabled device based on the localization information of the second radar-enabled device; and
configuring operation of the first radar-enabled device based on the localization information of the first radar-enabled device.

24. The method of claim 23, wherein determining that the first radar-enabled device is co-located with the second radar-enabled device comprises:
- detecting, at the first radar-enabled device, the second radar-enabled device via a short range or personal area network (PAN) communication; and
- after detecting the second radar-enabled device:
    - detecting, at the first radar-enabled device, a radar signal transmitted by the second radar-enabled device, and
    - in response to detecting the radar signal, deeming that the first radar-enabled device is co-located with the second radar-enabled device.

25. The method of claim 23, further comprising:
- subsequent to setting the localization information of the first radar-enabled device, adjusting a radar transmission timing scheme of the first radar-enabled device to avoid subsequent detections of radar signals transmitted by the second radar-enabled device.

26. The method of claim 25, further comprising:
- subsequent to adjusting the radar transmission timing scheme:
    - determining, at the first radar-enabled device, that the first radar-enabled device is no longer co-located with the second radar-enabled device, and
    - reverting the radar transmission timing scheme of the first radar-enabled device to a previous radar transmission timing scheme.

* * * * *